(12) United States Patent
Garcia Blanco (10) Patent No.: US 12,188,596 B2
(45) Date of Patent: Jan. 7, 2025

(54) CONNECTION SYSTEM FOR FLUID CONDUCTION

(71) Applicant: J. Juan, S.A., Barcelona (ES)

(72) Inventor: Joaquin Garcia Blanco, Barcelona (ES)

(73) Assignee: J. JUAN, S.A., Barcelona (ES)

( * ) Notice: Subject to any disclaimer, the term of this patent is extended or adjusted under 35 U.S.C. 154(b) by 0 days.

(21) Appl. No.: 18/462,853

(22) Filed: Sep. 7, 2023

(65) Prior Publication Data

US 2024/0084938 A1   Mar. 14, 2024

(30) Foreign Application Priority Data

Sep. 9, 2022   (EP) ..................................... 22194747

(51) Int. Cl.
 *F16L 37/14* (2006.01)
 *F16L 21/025* (2006.01)
(52) U.S. Cl.
 CPC ........... *F16L 37/146* (2013.01); *F16L 21/025* (2013.01)
(58) Field of Classification Search
 CPC ....... F16L 21/02; F16L 21/025; F16L 21/035; F16L 17/02; F16L 37/14; F16L 37/142; F16L 37/144; F16L 37/148; F16L 37/146
 See application file for complete search history.

(56) References Cited

U.S. PATENT DOCUMENTS

| | | | | |
|---|---|---|---|---|
| 2019/0137019 | A1* | 5/2019 | Nowell | E21B 17/05 |
| 2020/0400256 | A1* | 12/2020 | Ting | F16L 37/146 |
| 2021/0024049 | A1* | 1/2021 | Garcia Blanco | F16L 37/56 |
| 2021/0116063 | A1* | 4/2021 | Chung | F16L 27/0837 |

FOREIGN PATENT DOCUMENTS

| | | |
|---|---|---|
| EP | 3104056 A1 | 12/2016 |
| EP | 3862609 A1 | 8/2021 |

* cited by examiner

*Primary Examiner* — Aaron M Dunwoody
(74) *Attorney, Agent, or Firm* — LUCAS & MERCANTI, LLP (57) ABSTRACT

A connection system for fluid conduction having a male connection end (2), a female connection end (3) and a retaining element (4). The male connection end (2) having a retaining groove (21) which makes up a first recess (22). The female connection end (3) having a retaining hole (31) which makes up a second recess (32) facing the first recess (22). The retaining element (4) is designed to be inserted through the retaining hole (31) and be housed between the first recess (22) and the second recess (32) to keep the male connection end (2) attached to the female connection end (3) when both ends (2, 3) are connected. The connection system (1) has a gasket (5) placed between the male connection end (2) and the female connection end (3), configured to hinder relative movements of said ends (2, 3) when connected along an axial direction (X).

13 Claims, 6 Drawing Sheets

CONNECTION SYSTEM FOR FLUID CONDUCTION

CROSS-REFERENCE TO RELATED APPLICATION

This application claims the benefit of priority from European Patent Application No. 22194747, filed Sep. 9, 2022, the content of which is incorporated herein by reference.

FIELD OF THE INVENTION

The present invention relates to a connection system for fluid conduction of liquid or gaseous fluids, specially designed for braking, cooling or damping systems in vehicles (bikes, cars, motorcycles, etc.), among other systems in general.

BACKGROUND OF THE INVENTION

The connection systems for conducting fluids in the mentioned hydraulic systems should ensure the correct supply of the fluid to the different components of the system, at the same time providing the working pressure and possible overpressures to avoid any type of failure or leak which may affect the correct functioning of the system and/or put the safety of the users at risk.

In general, these systems comprise a significant number of connections between the different components of the same. For example, between two transport elements of the fluid (rigid tubes, flexible hoses, etc.), between a transport element and a functional element (hydraulic pump, brake caliper, damper, ABS, etc.), between other connections. At the same time, while the vehicles are increasingly more complex, the integration of these systems therein becomes more difficult and complicated. The lack of space, the variety of elements to be connected and/or the high number of connections to be made makes the assembly work of these system considerably difficult.

The document EP3104056A1 shows a connector for conducting fluids which facilitates the connection between the elements of the system during its assembly in the vehicle. Said connector comprises a first connection end (male element, normally a quick connector) configured to be inserted within a second connection end (female element, normally a hydraulic port) according to an axial axis or direction for connecting both ends. The first connection end in turn comprises a retaining groove which makes up a first recess, while the second connection end comprises a retaining hole which makes up a second recess facing the first recess when both ends are connected. Said connector further comprises a retaining element configured to be inserted through the retaining hole and be housed between the first recess and the second recess to keep the first connection end attached to the second connection end when both ends are connected. The retaining element is housed between the first recess and the second recess being it possible to leave a small clearance, for example 1 mm, which makes it possible a relative rotating movement between the first and the second connection end. In this way, the connection ends can be connected in any position, thus avoiding the need to twist the rigid tubes or the flexible hoses when mounting the circuit. This aspect facilitates considerably the mounting of the system. Once the working fluid has been inserted into the circuit, the system acquires pressure, causing a small relative axial movement between both connection ends to compensate the aforementioned clearance.

Despite the advantages provided by the connector of document EP3104056A1, it is yet observed that both connection ends are immobile with respect to one another as long as the pressure of the system is maintained. Therefore, free movements of the elements connected together cannot be avoided in certain situations. Said free movements may produce wear of the metallic components, which in turn may cause leakage from the hydraulic system.

The document EP3862609A1 shows a connector for conducting fluids wherein the male element comprises an elastic hoop to prevent the retaining element from coming out during the assembly of the coupling or when there is no longer pressure exerted in the system.

The present invention solves the aforementioned problem by means of a connection system for fluid conduction which assures stability and hermeticity to the hydraulic connection at any situation, further facilitating at the same time the connection between the elements of the system during the assembly thereof to the vehicle, in a simple, quick and safe manner, which design is easily adaptable to the different components of the system. All of this without forgoing the important features and high efficiency that are to be demanded of this type of connectors and being able to withstand peaks of pressure up to 1000 bar.

DESCRIPTION OF THE INVENTION

The connection system for fluid conduction of the present invention comprises a male connection end, a female connection end and a retaining element. The male connection end is designed to be inserted into the female connection end along an axial direction to connect both ends. The two connection ends are connected in shape coupling and are tightly assembled through the retaining element.

The connection ends may be either two elements for conveying the fluid (rigid tubes, flexible hoses, etc.) connected to one another, or an element for conveying the fluid connected to another functional element such as a hydraulic port (hydraulic pump, master cylinder, brake caliper, damper, ABS, etc.), among other elements. The materials for the connection ends may be, for example, machining steel coated or stainless steel.

The retaining element may be any type of screw, pin, bolt, rod, key, or other similar mechanical fixing elements, which would work together with threaded connector holes, machinings, holes, bores or drills, as may be the case.

The male connection end comprises a retaining groove which makes up a first recess. The female connection end comprises a retaining hole which makes up a second recess facing the first recess when both ends are connected. The retaining element is designed to be inserted through the retaining hole and be housed between the first recess and the second recess to keep the male connection end attached to the female connection end when both ends are connected.

The connection system comprises a gasket placed between the male connection end and the female connection end, configured to hinder relative movements of said ends when connected along the axial direction.

The gasket may be any kind of deformable material in the form of a shaped sheet or O-ring, acting under compression in the junction between the male connection end and the female connection end at any operating situation, even if the pressure of the system is not maintained. It is therefore noted that the gasket avoids the free play between the male connection end and the female connection end, and at the same time seals the junction between both connection ends to prevent leakage.

Preferably, the gasket is pressed between the male connection end and the female element when both ends are connected along the axial direction.

The pressure of the gasket can be adjusted by varying the dimensions and/or properties of the gasket according to the operational needs. This adjustment must allow the introduction of the retaining element through the retaining hole for connecting the connection ends, and to assure that, once the retaining element is housed between the first recess and the second recess, the gasket remains under compression.

Preferably, the gasket is partly or totally disposed outside the female element when both ends are connected along the axial direction.

Preferably, the gasket is formed by a rubber O-ring.

Preferably, the gasket is made of ethylene propylene diene monomer rubber (EPDM) or fluorine rubber (FKM).

Preferably the male connection end comprises an outer protruding wall designed to press the gasket against the female connection end.

Preferably, the male connection end comprises a boundary groove designed to house the gasket, which is disposed between the male element and the female element when both ends are connected along the axial direction.

Preferably, the boundary groove is located next to the outer protruding wall.

The male connection end comprises a first cone wall configured to receive a first portion of the gasket.

The female element comprises a second cone wall configured to receive a second portion of the gasket.

The first cone wall faces the second cone wall when the male connection end and the female connection end are connected along the axial direction, forming a circular receiving groove having a V-shaped cross section designed to receive the pressure exerted by the gasket.

That is, the V-shaped cross section is configured to partly lodge the gasket and to transmit its pressure. So, when the gasket is pushed by the outer protruding wall against the internal angle that forms the circular receiving groove, it presses the cone walls in opposite direction. In this manner, a better and more homogeneous distribution of forces is obtained all along the circular receiving groove.

According to a first preferred embodiment, the first recess is formed by a first circular groove concentric to the axial direction. The first circular groove allows a relative rotational movement between the male connection end and the female connection end once attached. So, the male connection end can be inserted within the female connection end at any position.

This first preferred embodiment is especially intended for connections in which the connection ends are aligned to one another, once connected, without any change of direction or orientation of the same being produced, such that the elements with which they are associated do not usually have a predetermined mounting position.

According to a second preferred embodiment, the first recess is formed by a first straight groove. The first straight groove avoids a subsequent relative rotational movement between the male connection end and the female connection end once attached. So, a single insertion position of the male connection end within a female connection end can be fixed.

This second preferred embodiment is especially intended for connections that only permit a single mounting position so as not to interfere with other components of the vehicle (such as the frame, chassis, fork, engine, handlebars, wheel, etc.). Such connections may be found for example in the automotive sector, and especially in the field of motorcycle brake systems, such as the wheel anti-lock braking systems (ABS). In this way, the assembly operations of the vehicle are considerably facilitated, the mounting times of the elements of said systems are reduced and the risk of said elements being mounted in an incorrect position is eliminated.

For both embodiments, preferably the second recess of the female connection end is formed by a second straight groove, which in combination with the first circular groove allows the relative rotational movement between the male connection end and the female connection end once attached, and which in combination with the first straight groove prevents said rotational movement. The second straight groove also eases the manufacturing process as the second recess may be formed by simply drilling the female connection end.

Preferably, the male connection end comprises one or more circular slots, concentric to the axial direction, which house one or more sealing O-rings to ensure the tightness of the connection system when both ends are connected along said axial direction. So, the hermeticity of the system is fully assured by providing sealing means interposed between the male connection end and the female connection end, using preferably two O-rings. As the gasket also performs a sealing function, double safety is achieved for preventing leakage once both ends are connected.

Preferably, the male connection end comprises a front portion wherein the one or more circular slots are disposed, having a front outer diameter, and an intermediate portion wherein the retaining groove is located, having an intermediated outer diameter. The front outer diameter is smaller than the intermediated outer diameter.

Said double diameter avoids the O-rings to be cut during assembly of the connection. More specifically, if the front portion and intermediate portion had the same outer diameter, the O-rings of the front portion could rub against the transversal edge of the second recess of the female connection end during the insertion of the male connection end and be damaged.

In general, the connection system for fluid conduction of the present invention provides a faster assembly and maintenance, as it only requires joining both connection ends and inserting the retaining element, thus easing the manufacturing process. It provides a cost reduction and a lighter solution, as it has a smaller number of components, and it offers an integrated good looking and a more aesthetical appearance.

BRIEF DESCRIPTION OF THE DRAWINGS

What follows is a very brief description of a series of drawings that aid in better understanding the invention, and which are expressly related to two embodiments of said invention that are presented by way of non-limiting examples of the same.

DETAILED DESCRIPTION OF THE INVENTION

Figure 1:
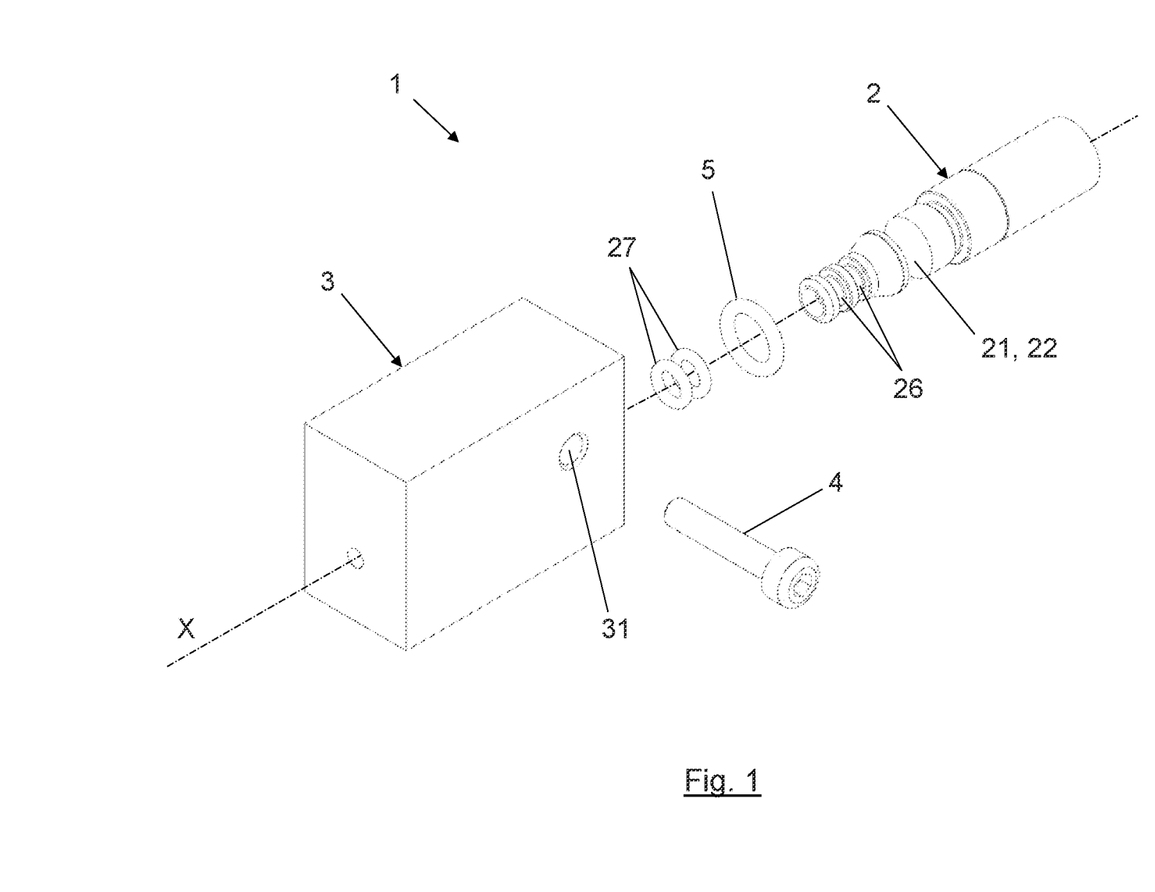
FIG. 1 represents an exploded perspective view of the connection system for fluid conduction of the present invention, according to a first preferred embodiment.
Figure 2:
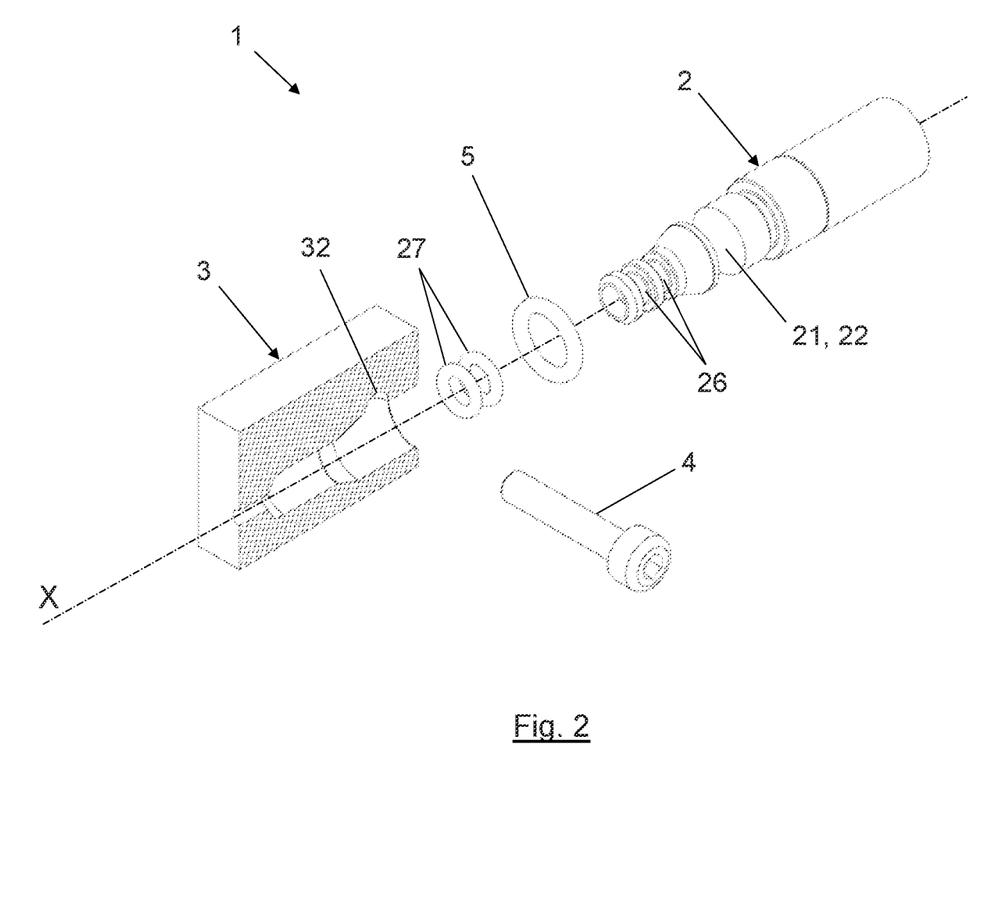
FIG. 2 represents an exploded perspective view of the connection system for fluid conduction of the present invention, according to a first preferred embodiment, showing the female connection end longitudinally sectioned.

FIGS. 1 and 2 show two exploded views of the connection system (1) for fluid conduction of the present invention, according to a first preferred embodiment. As seen, the connection system (1) comprises a male connection end (2), a female connection end (3) and a retaining element (4). The male connection end (2) is designed to be inserted into the female connection end (3) along an axial direction (X) to connect both ends (2, 3). The two connection ends (2, 3) are connected in shape coupling and are tightly assembled through the retaining element (4).

The male connection end (2) comprises a retaining groove (21) which makes up a first recess (22). The male connection end (2) further comprises two circular slots (26), concentric to the axial direction (X), each one of them housing one sealing O-ring (27) to ensure the tightness of the connection system (1) when both ends (2, 3) are connected along said axial direction (X).

The female connection end (3) comprises a retaining hole (31) which makes up a second recess (32) facing the first recess (22) when both ends (2, 3) are connected. The retaining element (4) is designed to be inserted through the retaining hole (31) and be housed between the first recess (22) and the second recess (32) to keep the male connection end (2) attached to the female connection end (3) when both ends (2, 3) are connected.

The connection system (1) comprises a gasket (5) formed by a rubber O-ring placed between the male connection end (2) and the female connection end (3), configured to hinder relative movements of said ends (2, 3) when connected along the axial direction (X).

Figure 3:
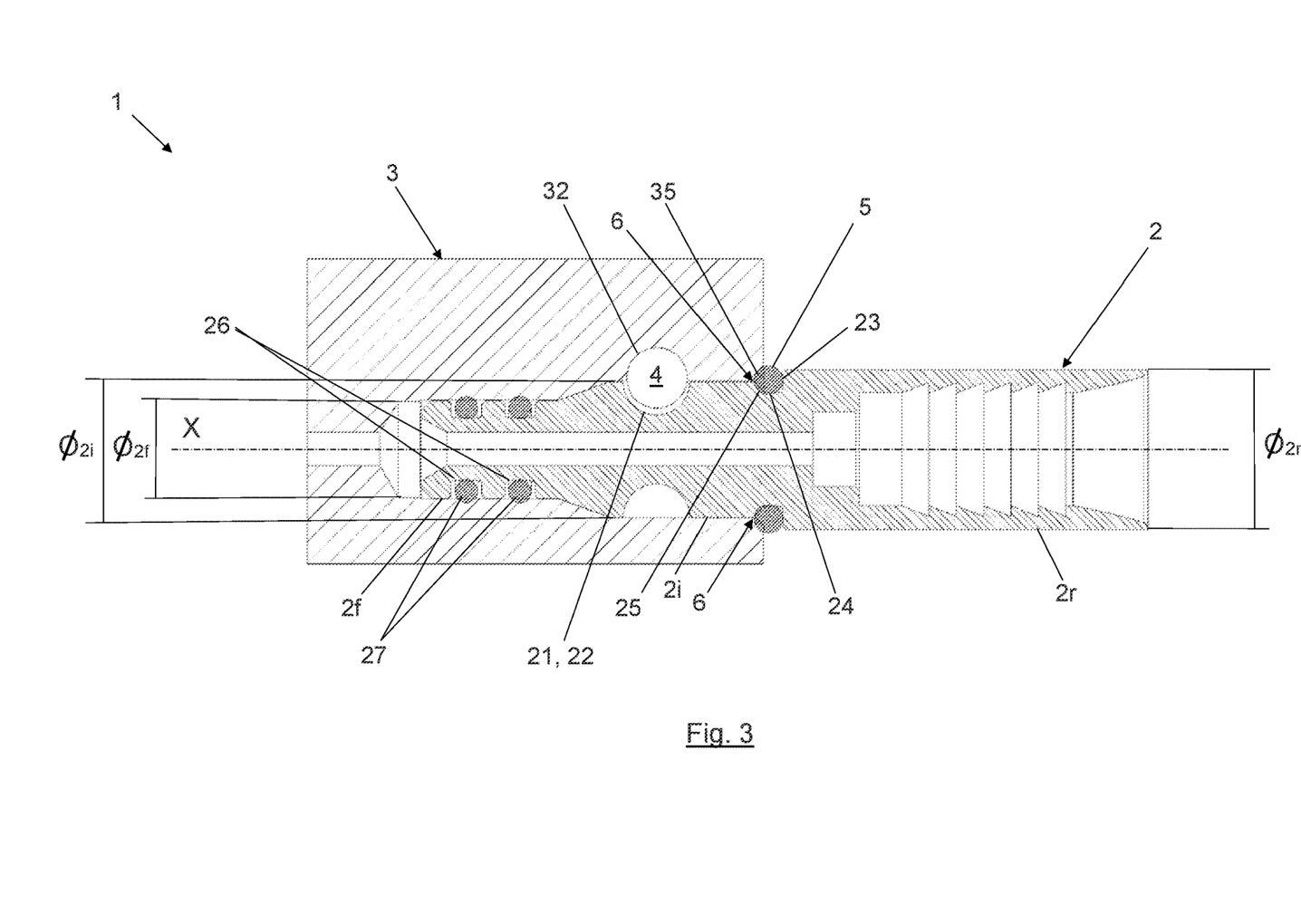
FIG. 3 represents a longitudinal section of the connection system for fluid conduction of the present invention, according to a first preferred embodiment, when both connection ends are connected.

FIG. 3 shows a longitudinal section of the connection system (1) for fluid conduction of the present invention, according to a first preferred embodiment, when both connection ends (2, 3) are connected.

The gasket (5) acts under compression in the junction between the male connection end (2) and the female connection end (3) at any operating situation, even if the pressure of the system is not maintained. In this way, the gasket (5) avoids the free play between the male connection end (2) and the female connection end (3), and at the same time seals the junction between both connection ends (2, 3) to prevent leakage.

The hermeticity of the system is fully assured by providing sealing means interposed between the male connection end (2) and the female connection end, using the two O-rings (27). As the gasket (5) also performs a sealing function, double safety is achieved for preventing leakage once both ends (2, 3) are connected.

As can be seen in FIG. 3, the gasket (5) is pressed between the male connection end (2) and the female connection end (3) when both ends (2, 3) are connected along the axial direction (X). The pressure of the gasket (5) can be adjusted by varying the dimensions and/or properties of the gasket (5) according to the operational needs. This adjustment must allow the introduction of the retaining element (4) through the retaining hole (31) for connecting the connection ends (2, 3), and to assure that, once the retaining element (4) is housed between the first recess (22) and the second recess (32), the gasket (5) remains under compression.

The gasket (5) is partly disposed outside the female element (3) when both ends (2, 3) are connected along the axial direction (X).

The male connection end (2) comprises an outer protruding wall (23) designed to press the gasket (5) against the female connection end (3). The male connection end (2) further comprises a boundary groove (24) designed to house the gasket (5), which is disposed between the male element (2) and the female element (3) when both ends (2, 3) are connected along the axial direction (X). The boundary groove (24) is located next to the outer protruding wall (23).

The male connection end (2) further comprises a first cone wall (25) configured to receive a first portion of the gasket (5).

The female element (3) further comprises a second cone wall (35) configured to receive a second portion of the gasket (5).

As can be seen in FIG. 3, the first cone wall (25) faces the second cone wall (35) when the male connection end (2) and the female connection end (3) are connected along the axial direction (X), forming a circular receiving groove (6) having a V-shaped cross section designed to receive the pressure exerted by the gasket (5).

That is, the V-shaped cross section is configured to partly lodge the gasket (5) and to transmit its pressure. So, when the gasket (5) is pushed by the outer protruding wall (23) against the internal angle that forms the circular receiving groove (6), it presses the cone walls (25, 35) in opposite direction. In this manner, a better and more homogeneous distribution of forces is obtained all along the circular receiving groove (6).

As can be seen in FIG. 3, the male connection end (2) comprises a front portion (2f) wherein the two circular slots (26) are disposed, having a front outer diameter ($Ø_{2f}$), and an intermediate portion (2i) wherein the retaining groove (21) is located, having an intermediated outer diameter ($Ø_{2i}$). The front outer diameter ($Ø_{2f}$) is smaller than the intermediated outer diameter ($Ø_{2i}$).

Said double diameter avoids the two O-rings (27) to be cut during assembly of the connection. More specifically, if the front portion (2f) and intermediate portion (2i) had the same outer diameter ($Ø_{2i}$, $Ø_{2f}$), the O-rings (27) of the front portion (2f) could rub against the transversal edge of the second recess (32) of the female connection end (3) during the insertion of the male connection end (2) and be damaged.

The male connection end (2) further comprises a rear portion (2r) having a rear outer diameter ($Ø_{2r}$). The rear outer diameter ($\emptyset_{2r}$) is larger than the intermediated outer diameter ($\emptyset_{2i}$), so that the outer protruding wall (23) can press the gasket (5) against the female connection end (3).

Figure 4:
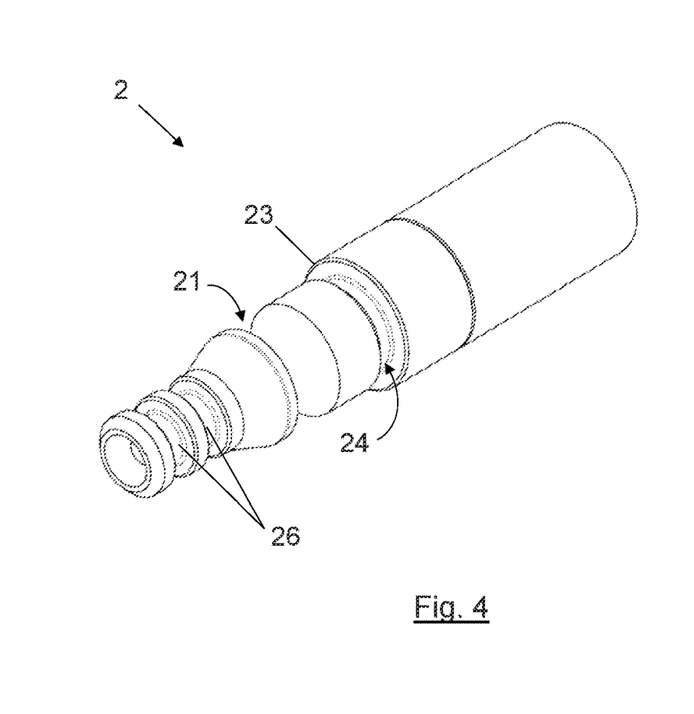
FIG. 4 represents a perspective view of the male connection end of the connection system for fluid conduction of the present invention, according to a first preferred embodiment.
Figure 5:
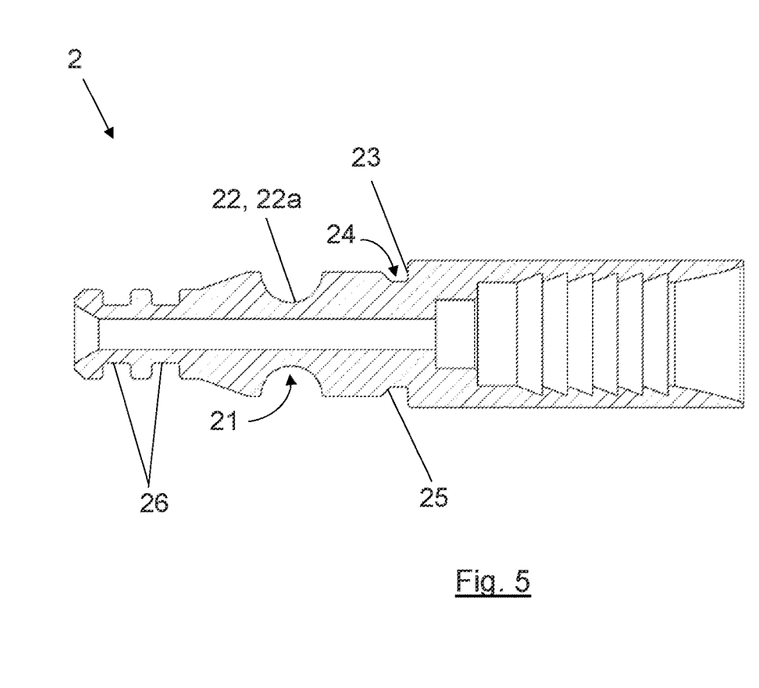
FIG. 5 represents a longitudinal section of the male connection end of the connection system for fluid conduction of the present invention, according to a first preferred embodiment.

FIGS. 4 and 5 show different views of the male connection end (2), according to a first preferred embodiment.

According to this first preferred embodiment, the first recess (22) is formed by a first circular groove (22a) concentric to the axial direction (X). The first circular groove (22a) allows a relative rotational movement between the male connection end (2) and the female connection end (3) once attached. So, the male connection end (2) can be inserted within the female connection end (3) at any position.

This first preferred embodiment is especially intended for connections in which the connection ends are aligned to one another, once connected, without any change of direction or orientation of the same being produced, such that the elements with which they are associated do not usually have a predetermined mounting position.

Figure 6:
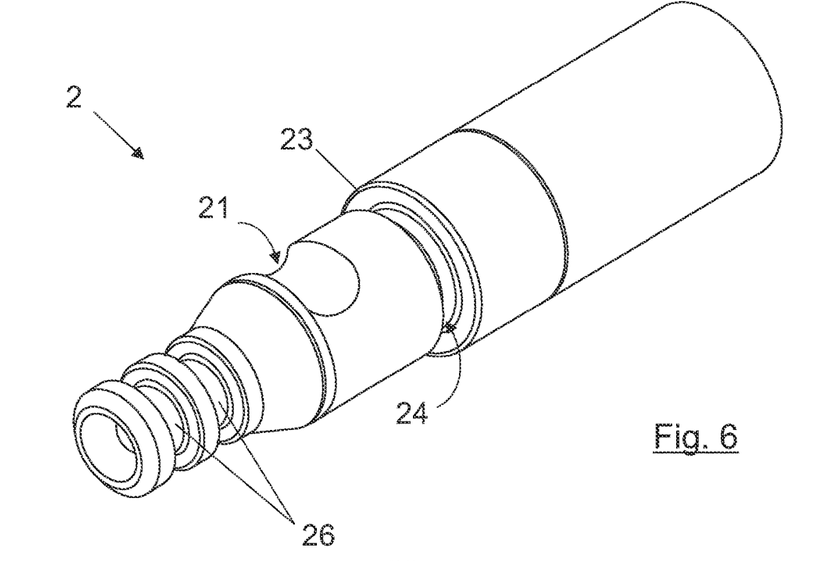
FIG. 6 represents a perspective view of the male connection end of the connection system for fluid conduction of the present invention, according to a second preferred embodiment.
Figure 7:
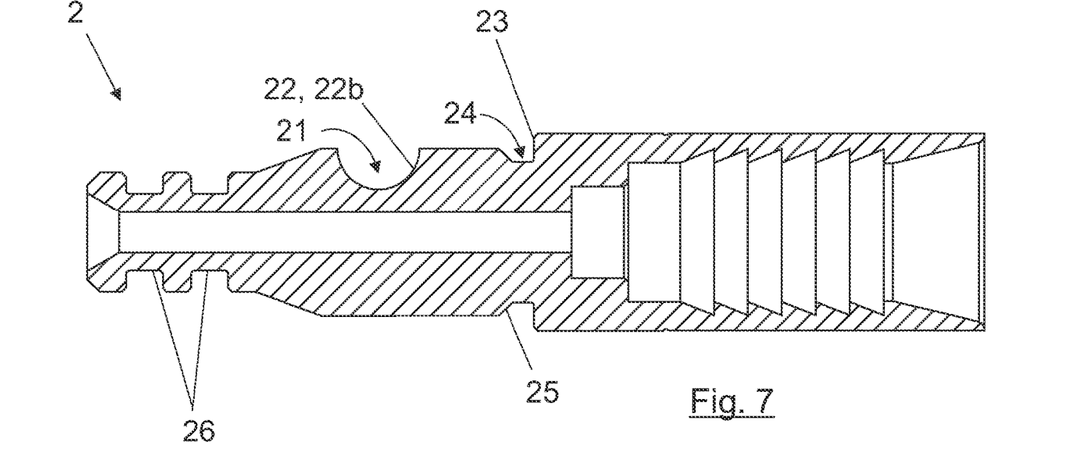
FIG. 7 represents a longitudinal section of the male connection end of the connection system for fluid conduction of the present invention, according to a second preferred embodiment.
Figure 8:
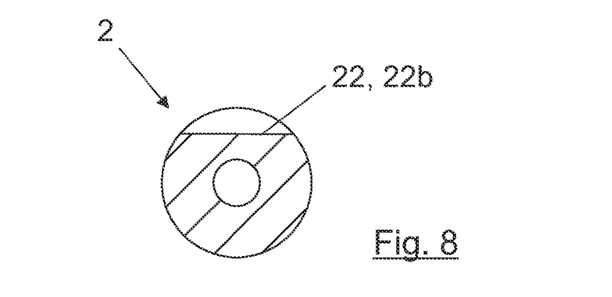
FIG. 8 represents a cross-section of the male connection end of FIGS. 6 and 7 along the retaining groove.

FIGS. 6-8 show different views of the male connection end (2), according to a second preferred embodiment.

According to this second preferred embodiment, the first recess (22) is formed by a first straight groove (22b). The first straight groove (22b) avoids a subsequent relative rotational movement between the male connection end (2) and the female connection end (3) once attached. So, a single insertion position of the male connection end (2) within a female connection (3) end can be fixed.

This second preferred embodiment is especially intended for connections that only permit a single mounting position so as not to interfere with other components of the vehicle (such as the frame, chassis, fork, engine, handlebars, wheel, etc.). Such connections may be found for example in the automotive sector, and especially in the field of motorcycle brake systems, such as the wheel anti-lock braking systems (ABS). In this way, the assembly operations of the vehicle are considerably facilitated, the mounting times of the elements of said systems are reduced and the risk of said elements being mounted in an incorrect position is eliminated.

Figure 9:
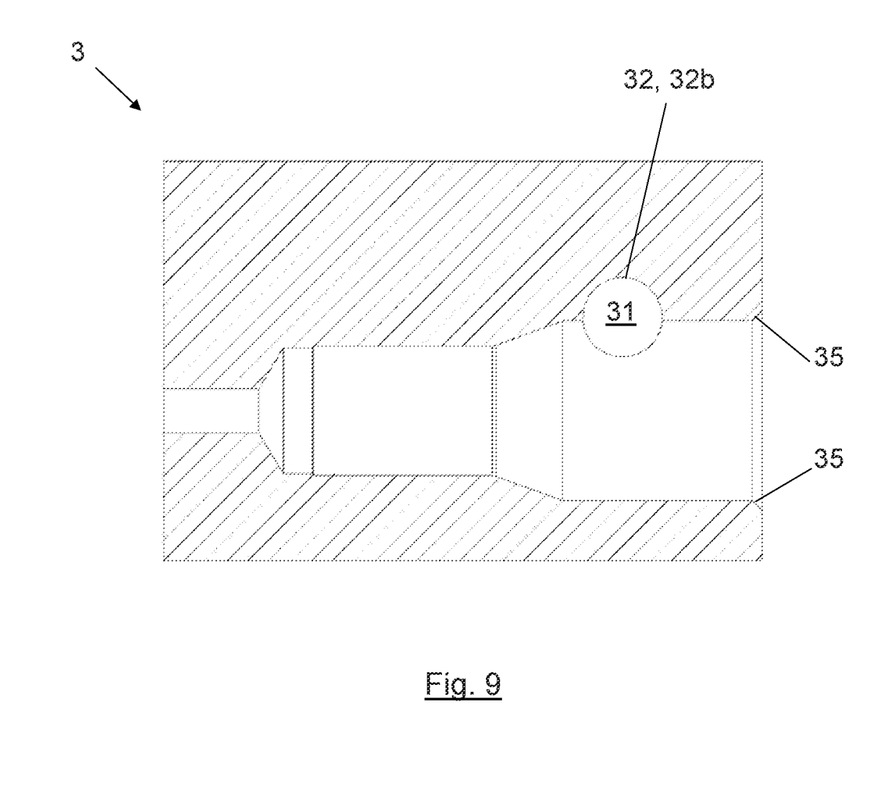
FIG. 9 represents a longitudinal section of the female connection end of the connection system for fluid conduction of the present invention.
Figure 10:
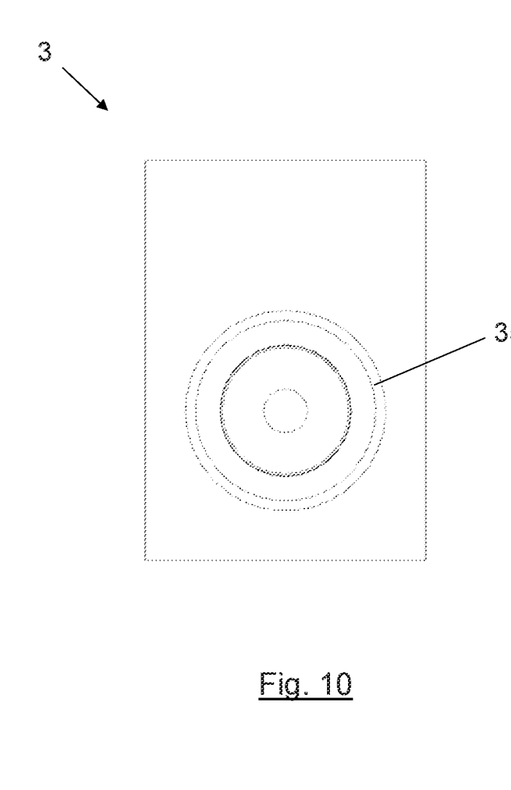
FIG. 10 represents a front view of the female connection end of the connection system for fluid conduction of the present invention.

FIGS. 9 and 10 show respectively a longitudinal section and a front view of the female connection end (3).

The configuration of the female connection end (3) is the same for the two embodiments of the male connection end (2) previously described. As seen, the second recess (32) is formed by a second straight groove (32b), which in combination with the first circular groove (22a) allows the relative rotational movement between the male connection end (2) and the female connection end (3) once attached, and which in combination with the first straight groove (22b) prevents said rotational movement. The second straight groove (32b) also eases the manufacturing process as the second recess (32) may be formed by simply drilling the female connection end (3).

The invention claimed is:

1. A connection system for fluid conduction, comprising a male connection end (2), a female connection end (3) and a retaining element (4); wherein the male connection end (2) is designed to be inserted into the female connection end (3) along an axial direction (X) to connect both ends (2, 3); said male connection end (2) comprising a retaining groove (21) which makes up a first recess (22); said female connection end (3) comprising a retaining hole (31) which makes up a second recess (32) facing the first recess (22) when both ends (2, 3) are connected; and wherein said retaining element (4) is designed to be inserted through the retaining hole (31) and be housed between the first recess (22) and the second recess (32) to keep the male connection end (2) attached to the female connection end (3) when both ends (2, 3) are connected; said connection system (1) comprising a gasket (5) placed between the male connection end (2) and the female connection end (3), configured to hinder relative movements of said ends (2, 3) when connected along said axial direction (X); wherein the male connection end (2) comprises a first cone wall (25) configured to receive a first portion of the gasket (5); and in that the female element (3) comprises a second cone wall (35) configured to receive a second portion of the gasket (5); wherein the first cone wall (25) faces the second cone wall (35) when the male connection end (2) and the female connection end (3) are connected along the axial direction (X), forming a circular receiving groove (6) having a V-shaped cross section designed to receive the pressure exerted by the gasket (5).

2. The connection system according to claim 1, wherein the gasket (5) is pressed between the male connection end (2) and the female element (3) when both ends (2, 3) are connected along the axial direction (X).

3. The connection system according to claim 1, wherein the gasket (5) is partly or totally disposed outside the female element (3) when both ends (2, 3) are connected along the axial direction (X).

4. The connection system according to claim 1, wherein the gasket (5) is formed by a rubber O-ring.

5. The connection system according to claim 1, wherein the gasket (5) is made of ethylene propylene diene monomer rubber (EPDM) or fluorine rubber (FKM).

6. The connection system according to claim 1, wherein the male connection end (2) comprises an outer protruding wall (23) designed to press the gasket (5) against the female connection end (3).

7. The connection system according to claim 6, wherein the male connection end (2) comprises a boundary groove (24) designed to house the gasket (5), which is disposed between the male element (2) and the female element (3) when both ends (2, 3) are connected along the axial direction (X).

8. The connection system according to claim 7, wherein the boundary groove (24) is located next to the outer protruding wall (23).

9. The connection system according to claim 1, wherein the first recess (22) is formed by a first circular groove (22a) concentric to the axial direction (X).

10. The connection system according to claim 1, wherein the first recess (22) is formed by a first straight groove (22b).

11. The connection system according to claim 1, wherein the second recess (32) is formed by a second straight groove (32b).

12. The connection system according to claim 1, wherein the male connection end (2) comprises one or more circular slots (26), concentric to the axial direction (X), which house one or more sealing O-rings (27) to ensure the tightness of the connection system (1) when both ends (2, 3) are connected along said axial direction (X).

13. The connection system according to claim 1, wherein the connection system is a hydraulic system for fluid conduction in vehicles.

* * * * *